(12) United States Patent
Wolf et al.

(10) Patent No.: US 7,673,564 B2
(45) Date of Patent: Mar. 9, 2010

(54) METHOD OF MAKING A LINED TRAY

(75) Inventors: John R. Wolf, Phillipsburg, NJ (US); T. Brad Zix, Acworth, GA (US)

(73) Assignee: Cryovac, Inc., Duncan, SC (US)

( * ) Notice: Subject to any disclaimer, the term of this patent is extended or adjusted under 35 U.S.C. 154(b) by 447 days.

(21) Appl. No.: 11/026,482

(22) Filed: Dec. 30, 2004

(65) Prior Publication Data

US 2006/0147240 A1 Jul. 6, 2006

(51) Int. Cl.
*B32B 37/02* (2006.01)
(52) U.S. Cl. .................... 101/483; 156/277; 428/35.7
(58) Field of Classification Search .................. None
See application file for complete search history.

(56) References Cited

U.S. PATENT DOCUMENTS 4,200,481 A   4/1980  Faller
5,106,676 A * 4/1992  Sato et al. .................. 428/212
5,118,561 A   6/1992  Gusavage et al.
5,366,791 A * 11/1994 Carr et al. ................ 428/195.1
5,631,036 A   5/1997  Davis
6,231,953 B1  5/2001  Mossbrook et al.
6,627,273 B2  9/2003  Wolf et al.
2003/0175392 A1 9/2003 Garwood

FOREIGN PATENT DOCUMENTS

JP       2003300291      10/2003

* cited by examiner

*Primary Examiner*—Judy Nguyen
*Assistant Examiner*—Joshua D. Zimmerman
(74) *Attorney, Agent, or Firm*—Daniel B. Ruble

(57) ABSTRACT

A lined tray may be made by printing on a film an ink comprising from about 15 to about 50 weight percent binder resin selected from ethylene/vinyl acetate copolymers, polyamide polymers, polystyrene polymers, and acrylic polymers. The printed film is laminated to a tray substrate to form a lined tray substrate, so that the outermost ink surface of the printed film is directly adhered to the tray substrate. The lined tray may be formed into a tray.

23 Claims, 6 Drawing Sheets

METHOD OF MAKING A LINED TRAY

BACKGROUND OF THE INVENTION

The present invention relates to lined trays, and more particularly to methods of making a lined tray comprising a printed liner.

Packaging may comprise a tray support member, such as a foam tray, to support a product such as a food product. A lid film may be sealed to the tray to enclose the product within the package. A liner film may be laminated to the surface of the tray to increase the tray's barrier attributes, enhance the tray's rigidity or crack-resistance, and/or provide a heat-seal surface for the lid.

It may be desirable to provide a printed image on the tray for branding or other informational purposes. However, it may be difficult to print an ink directly on the tray material and undesirable for the printed ink to directly contact the packaged product. The ink may be trap-printed between the liner and the tray substrate; however, the ink may interfere with (i.e., weaken) the bond between the liner film and the tray substrate, so that the liner too easily delaminates or "bubbles" from the tray, for example during thermoforming of the tray.

SUMMARY OF THE INVENTION

One or more embodiments of the present invention may address one or more of these problems. In one embodiment, a lined tray may be made by steps comprising printing on a film an ink comprising from about 15 to about 50 weight percent binder resin. The binder resin may be selected from one or more of ethylene/vinyl acetate copolymers, polyamide polymers, polystyrene polymers, and acrylic polymers. The ink is dried to form an outermost ink surface of a printed film. The printed film is laminated to a tray substrate to form a lined tray substrate, so that the outermost ink surface is directly adhered to the tray substrate. The lined tray may be formed into a tray.

In another embodiment, a lined tray may be made by steps comprising providing a printed film. The printed film comprises a printed image comprising an outermost ink surface. An overprint varnish is applied over at least a portion of the outermost ink surface. The overprint varnish may comprise from about 1 to about 50 weight percent of binder resin. The binder resin may be selected from one or more of ethylene/vinyl acetate copolymers, polyamide polymers, polystyrene polymers, and acrylic polymers. The overprint varnish is dried to form an outermost varnish surface of a varnished printed film. The varnished printed film is laminated to a tray substrate to form a lined tray substrate. The outermost varnish surface is directly adhered to the tray substrate. The lined tray may be formed into a tray.

These and other advantages and features of the present invention will be more readily understood and appreciated by reference to the detailed description of the invention and the drawings.

BRIEF DESCRIPTION OF THE DRAWINGS

The accompanying drawings show some but not all embodiments of the invention. Like numbers refer to like elements throughout.

FIG. 3B is a magnified view of a portion of the tray of FIG. 3 showing an embodiment comprising outermost ink surface 56 of printed film 50 directly adhered to the tray substrate 12;

DETAILED DESCRIPTION OF THE INVENTION

Figure 1:
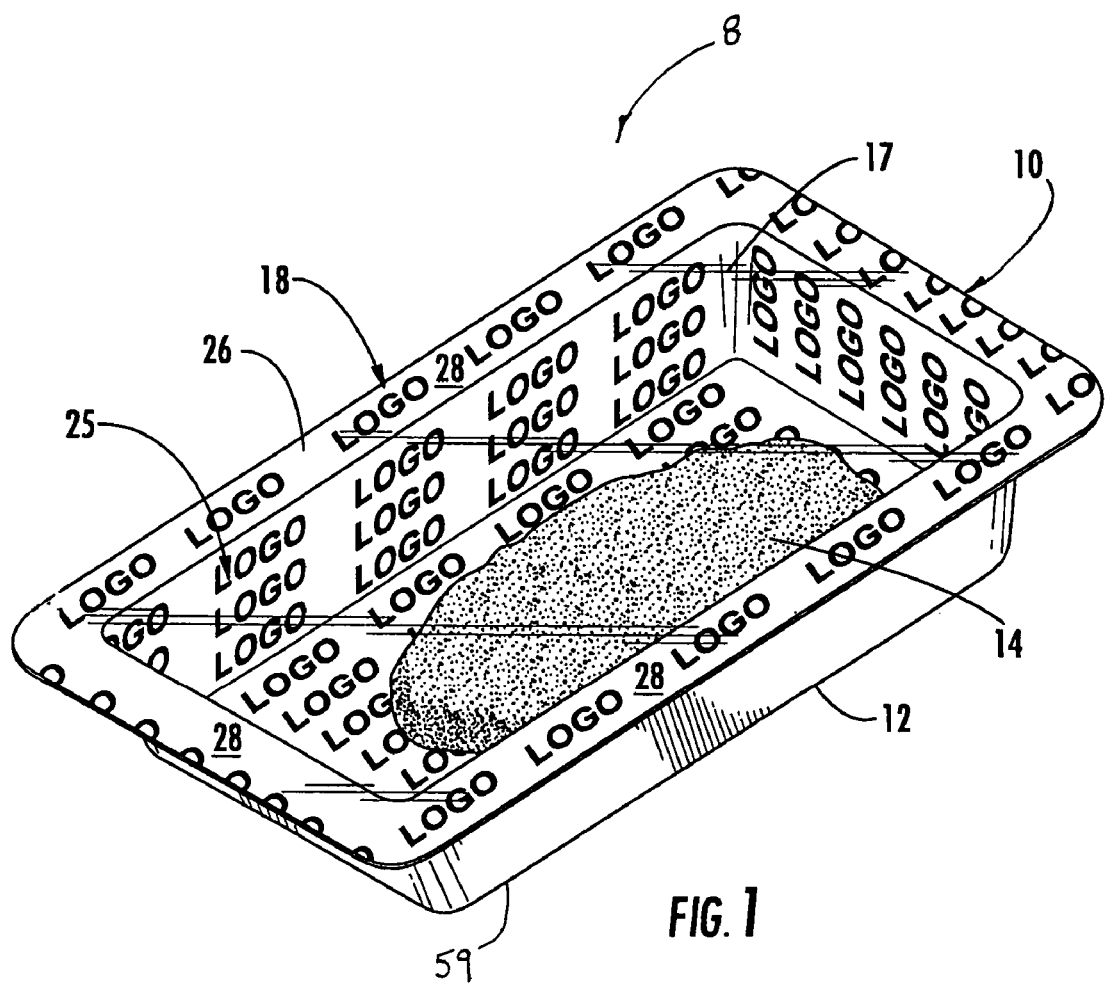
FIG. 1 is a perspective view of a packaged product 8 comprising a lid 17 sealed to a lined tray 10 having a printed image 18 disposed between the liner and the tray, and a packaged product 14 supported by the tray.
Figure 3:
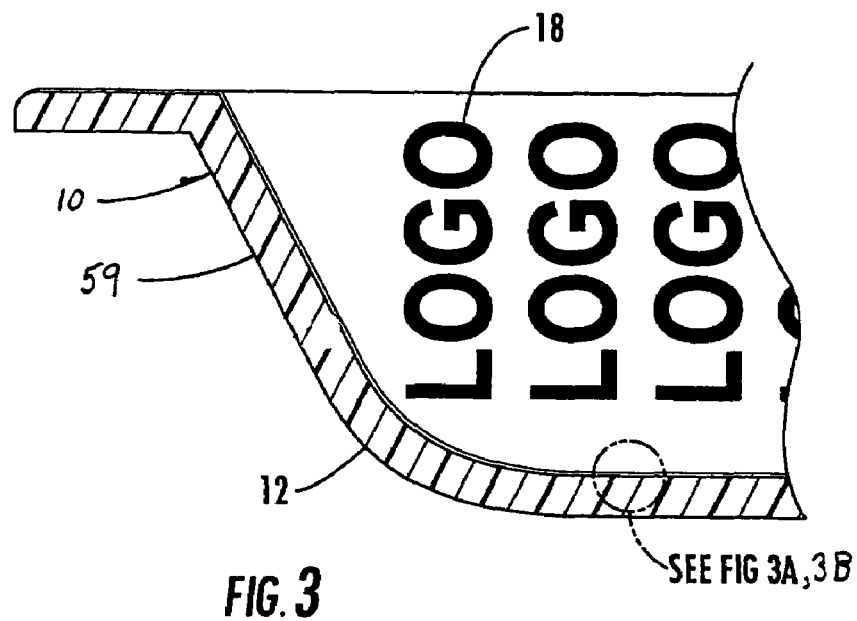
FIG. 3 is a representative cross-sectional side view of the lined tray of FIG. 2.
Figure 3A:
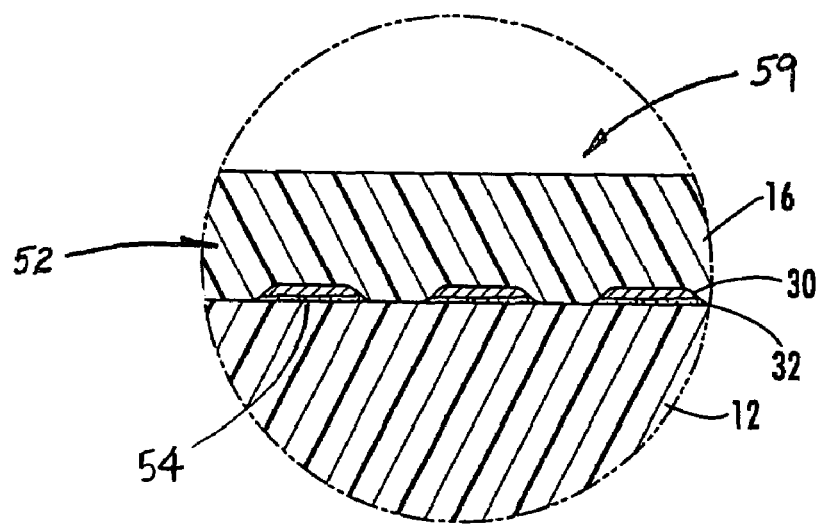
FIG. 3A is a magnified view of a portion of the tray of FIG. 3 showing an embodiment comprising outermost varnish surface 54 of varnished printed film 52 directly adhered to the tray substrate 12.
Figure 3:
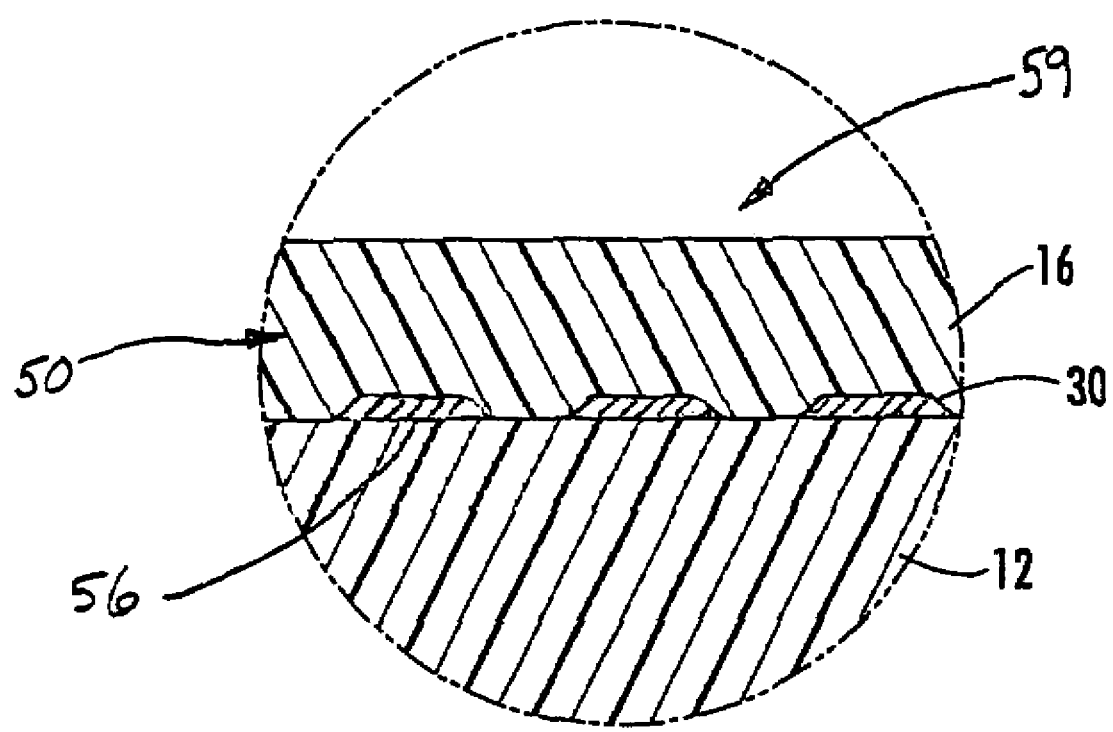
Figure 5:
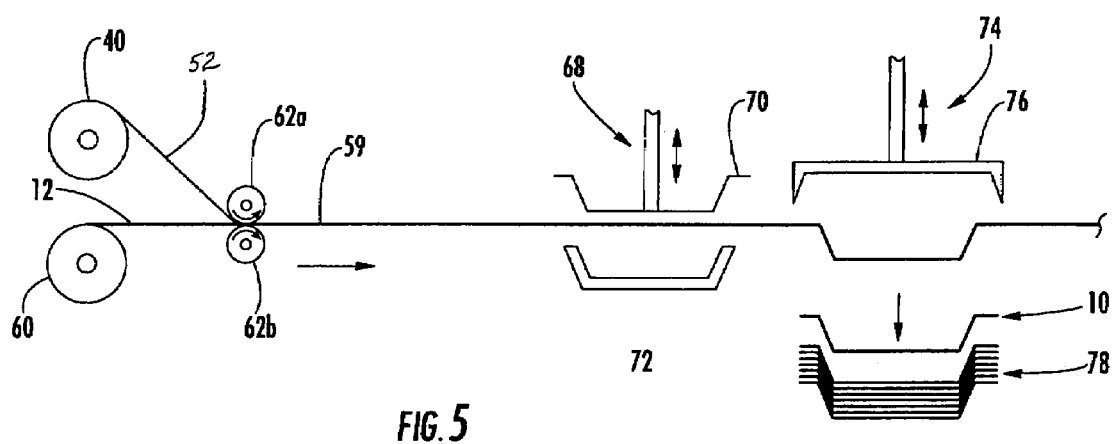
FIG. 5 is a schematic illustration of a process and system for producing lined trays of the present invention.

A lined tray substrate 59 may be formed by laminating a printed film or liner 50 to a tray substrate 12 so that the outermost ink surface 56 is directly adhered to the tray substrate 12 (FIG. 3B); or may be formed by laminating a varnished printed film or liner 52 to the tray substrate 12 so that the outermost overprint varnish surface 54 is directly adhered to the tray substrate 12 (FIG. 3A). The lined tray substrate 59 may be formed into a lined tray 10. (FIG. 5.) The printed liner or varnished printed liner may enhance the oxygen-barrier attributes of the lined tray 10, may enhance the ability of a lid 17 to be sealed to the lined tray 10, and/or may improve the moisture-barrier properties of the lined tray 10, for example to better enclose juices or meat purge that may emanate from product 14. (FIG. 1.) The printed image 18 may be visible through the laminated film.

Printed Film

The printed film or liner 50 may be formed by printing one or more inks on a film 16. The film may be monolayered. The film may comprise at least any of 2, 3, 4, 6, and 8 layers, and/or at most any of 12, 10, 8, 6, and 4 layers. The film may have an average thickness of at least about, and/or at most about, any of the following: 0.3, 0.5, 0.8, 1, 1.5, 2, 3, 4, 6, 8, 10, and 12 mils. (A "mil" is equal to 0.001 inch.)

The film 16 may comprise one or more thermoplastic polymers selected from polyolefins, ethylene/vinyl alcohol copolymer, ionomers, polyurethanes, polyamides, polyesters, vinylidene chloride polymers, and polystyrenes.

Polyolefins

The film 16 may comprise one or more polyolefins. Exemplary polyolefins include ethylene homo- and co-polymers and propylene homo- and co-polymers. The term "polyolefins" includes copolymers that contain at least 50 mole % monomer units derived from olefin. Exemplary ethylene homopolymers include high-density polyethylene ("HDPE") and low density polyethylene ("LDPE"). Ethylene copolymers include ethylene/alpha-olefin copolymers ("EAOs"), ethylene/unsaturated ester copolymers, and ethylene/(meth) acrylic acid. ("Copolymer" as used in this application means a polymer derived from two or more types of monomers, and includes terpolymers, etc.)

EAOs are copolymers of ethylene and one or more alpha-olefins, the copolymer having ethylene as the majority molepercentage content. The comonomer may include one or more $C_3$-$C_{20}$ α-olefins, one or more $C_4$-$C_{12}$ α-olefins, and one or more $C_4$-$C_8$ α-olefins. Useful α-olefins include 1-butene, 1-hexene, 1-octene, and mixtures thereof.

Exemplary EAOs include one or more of the following: 1) medium density polyethylene ("MDPE"), for example having a density of from 0.926 to 0.94 g/cm3; 2) linear medium density polyethylene ("LMDPE"), for example having a density of from 0.926 to 0.94 g/cm3; 3) linear low density polyethylene ("LLDPE"), for example having a density of from 0.915 to 0.930 g/cm3; 4) very-low or ultra-low density polyethylene ("VLDPE" and "ULDPE"), for example having density below 0.915 g/cm3, and 5) homogeneous EAOs. Useful EAOs include those having a density of at most about, and/or at least about, any of the following: 0.925, 0.922, 0.92, 0.917, 0.915, 0.912, 0.91, 0.907, 0.905, 0.903, 0.9, and 0.898 grams/cubic centimeter. Unless otherwise indicated, all densities herein are measured according to ASTM D1505.

The polyolefin polymers may be either heterogeneous or homogeneous. As is known in the art, heterogeneous polymers have a relatively wide variation in molecular weight and composition distribution. Heterogeneous polymers may be prepared with, for example, conventional Ziegler-Natta catalysts. Homogeneous polymers are typically prepared using metallocene or other single-site catalysts. Homogeneous polymers have relatively narrow molecular weight and composition distributions.

Another exemplary ethylene copolymer is ethylene/unsaturated ester copolymer, which is the copolymer of ethylene and one or more unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth)acrylate"), where the esters have from 4 to 12 carbon atoms.

Representative examples of the first ("vinyl ester") group of monomers include vinyl acetate, vinyl propionate, vinyl hexanoate, and vinyl 2-ethylhexanoate. The vinyl ester monomer may have from 4 to 8 carbon atoms, from 4 to 6 carbon atoms, from 4 to 5 carbon atoms, and preferably 4 carbon atoms.

Representative examples of the second ("alkyl (meth)acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and preferably from 4 to 5 carbon atoms.

The unsaturated ester (i.e., vinyl ester or alkyl (meth)acrylate) comonomer content of the ethylene/unsaturated ester copolymer may range from about 6 to about 18 weight %, and from about 8 to about 12 weight %, based on the weight of the copolymer. Useful ethylene contents of the ethylene/unsaturated ester copolymer include the following amounts: at least about 82 weight %, at least about 85 weight %, at least about 88 weight %, no greater than about 94 weight %, no greater than about 93 weight %, and no greater than about 92 weight %, based on the weight of the copolymer.

Representative examples of ethylene/unsaturated ester copolymers include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, and ethylene/vinyl acetate.

Another useful ethylene copolymer is ethylene/(meth) acrylic acid, which is the copolymer of ethylene and acrylic acid, methacrylic acid, or both.

Useful propylene copolymer includes: 1) propylene/ethylene copolymers ("EPC"), which are copolymers of propylene and ethylene having a majority weight % content of propylene, such as those having an ethylene comonomer content of less than 15%, less than 6%, and at least about 2% by weight and 2) propylene/butene copolymers having a majority weight % content of propylene.

EVOH

The film 16 may comprise one or more ethylene/vinyl alcohol copolymers ("EVOH"). EVOH may have an ethylene content of about 32 mole %, or at least about any of the following values: 20 mole %, 25 mole %, and 30 mole %. EVOH may have an ethylene content of below about any of the following values: 50 mole %, 40 mole %, and 33 mole %. As is know in the art, EVOH may be derived by saponifying or hydrolyzing ethylene/vinyl acetate copolymers, for example, to a degree of hydrolysis of at least about any of the following values: 50%, 85%, and 98%.

Ionomer

The film 16 may comprise one or more ionomers. Ionomer is a copolymer of ethylene and an ethylenically unsaturated monocarboxylic acid having the carboxylic acid groups partially neutralized by a metal ion, such as sodium or zinc. Useful ionomers include those in which sufficient metal ion is present to neutralize from about 10% to about 60% of the acid groups in the ionomer. The carboxylic acid is preferably "(meth)acrylic acid"—which means acrylic acid and/or methacrylic acid. Useful ionomers include those having at least 50 weight % and preferably at least 80 weight % ethylene units. Useful ionomers also include those having from 1 to 20 weight percent acid units. Useful ionomers are available, for example, from Dupont Corporation (Wilmington, Del.) under the SURLYN trademark.

Vinylidene Chloride Polymer

The film 16 may comprise one or more vinylidene chloride polymers. Vinylidene chloride polymer ("PVdC") refers to a vinylidene chloride-containing polymer or copolymer—that is, a polymer that includes monomer units derived from vinylidene chloride ($CH_2=CCl_2$) and also, optionally, monomer units derived from one or more of vinyl chloride, styrene, vinyl acetate, acrylonitrile, and $C_1$-$C_{12}$ alkyl esters of (meth) acrylic acid (e.g., methyl acrylate, butyl acrylate, methyl methacrylate). As used herein, "(meth)acrylic acid" refers to both acrylic acid and/or methacrylic acid; and "(meth)acrylate" refers to both acrylate and methacrylate. Examples of PVdC include one or more of the following: vinylidene chloride homopolymer, vinylidene chloride/vinyl chloride copolymer ("VDC/VC"), vinylidene chloride/methyl acrylate copolymer ("VDC/MA"), vinylidene chloride/ethyl acrylate copolymer, vinylidene chloride/ethyl methacrylate copolymer, vinylidene chloride/methyl methacrylate copolymer, vinylidene chloride/butyl acrylate copolymer, vinylidene chloride/styrene copolymer, vinylidene chloride/acrylonitrile copolymer, and vinylidene chloride/vinyl acetate copolymer.

Useful PVdC includes that having at least about 75, at most about 95, and at most about 98 weight % vinylidene chloride monomer. Useful PVdC (for example, as applied by latex emulsion coating) includes that having at least about any of 5%, 10%, and 15%—and/or at most about any of 25%, 22%, 20%, and 15 weight %—comonomer with the vinylidene chloride monomer.

A film or film layer that includes PVdC may also include a thermal stabilizer (e.g., a hydrogen chloride scavenger such as epoxidized soybean oil) and a lubricating processing aid (e.g., one or more acrylates).

Polyamide

The film 16 may comprise one or more polyamides. Useful polyamides include those of the type that may be formed by the polycondensation of one or more diamines with one or more diacids and/or of the type that may be formed by the polycondensation of one or more amino acids and/or of the type formed by the ring opening of cyclic lactams. Useful polyamides include aliphatic polyamides and aliphatic/aromatic polyamides.

Representative aliphatic diamines for making polyamides include those having the formula:

$$H_2N(CH_2)_nNH_2$$

where n has an integer value of 1 to 16. Representative examples include trimethylenediamine, tetramethylenediamine, pentamethylenediamine, hexamethylenediamine, octamethylenediamine, decamethylenediamine, dodecamethylenediamine, hexadecamethylenediamine. Representative aromatic diamines include p-phenylenediamine, 4,4'-diaminodiphenyl ether, 4,4' diaminodiphenyl sulphone, 4,4'-diaminodiphenylethane. Representative alkylated diamines include 2,2-dimethylpentamethylenediamine, 2,2,4-trimethylhexamethylenediamine, and 2,4,4 trimethylpentamethylenediamine. Representative cycloaliphatic diamines include diaminodicyclohexylmethane. Other useful diamines include heptamethylenediamine, nonamethylenediamine, and the like.

Representative diacids for making polyamides include dicarboxylic acids, which may be represented by the general formula:

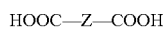

HOOC—Z—COOH where Z is representative of a divalent aliphatic or cyclic radical containing at least 2 carbon atoms. Representative examples include aliphatic dicarboxylic acids, such as adipic acid, sebacic acid, octadecanedioic acid, pimelic acid, suberic acid, azelaic acid, dodecanedioic acid, and glutaric acid; and aromatic dicarboxylic acids, such as such as isophthalic acid and terephthalic acid.

The polycondensation reaction product of one or more or the above diamines with one or more of the above diacids may form useful polyamides. Representative polyamides of the type that may be formed by the polycondensation of one or more diamines with one or more diacids include aliphatic polyamides such as poly(hexamethylene adipamide) ("nylon-6,6"), poly(hexamethylene sebacamide) ("nylon-6,10"), poly(heptamethylene pimelamide) ("nylon-7,7"), poly(octamethylene suberamide) ("nylon-8,8"), poly(hexamethylene azelamide) ("nylon-6,9"), poly(nonamethylene azelamide) ("nylon-9,9"), poly(decamethylene azelamide) ("nylon-10,9"), poly(tetramethylenediamine-co-oxalic acid) ("nylon-4,2"), the polyamide of n-dodecanedioic acid and hexamethylenediamine ("nylon-6,12"), the polyamide of dodecamethylenediamine and n-dodecanedioic acid ("nylon-12,12").

Representative aliphatic/aromatic polyamides include poly(tetramethylenediamine-co-isophthalic acid) ("nylon-4,I"), polyhexamethylene isophthalamide ("nylon-6,I"), polyhexamethylene terephthalamide ("nylon-6,T"), poly (2,2,2-trimethyl hexamethylene terephthalamide), poly(m-xylylene adipamide) ("nylon-MXD,6"), poly(p-xylylene adipamide), poly(hexamethylene terephthalamide), poly(dodecamethylene terephthalamide), and polyamide-MXD,I.

Representative polyamides of the type that may be formed by the polycondensation of one or more amino acids include poly(4-aminobutyric acid) ("nylon-4"), poly(6-aminohexanoic acid) ("nylon-6" or "poly(caprolactam)"), poly(7-aminoheptanoic acid) ("nylon-7"), poly(8-aminooctanoic acid) ("nylon-8"), poly(9-aminononanoic acid) ("nylon-9"), poly (10-aminodecanoic acid) ("nylon-10"), poly(7-aminoundecanoic acid) ("nylon-11"), and poly(12-aminododecanoic acid) ("nylon-12" or "poly(lauryllactam)").

Representative copolyamides include copolymers based on a combination of the monomers used to make any of the foregoing polyamides, such as, nylon-4/6, nylon-6/6, nylon-6/9, nylon-6/12, caprolactam/hexamethylene adipamide copolymer ("nylon-6,6/6"), hexamethylene adipamide/caprolactam copolymer ("nylon-6/6,6"), trimethylene adipamide/hexamethylene azelaiamide copolymer ("nylon-trimethyl 6,2/6,2"), hexamethylene adipamide-hexamethyleneazelaiamide caprolactam copolymer ("nylon-6,6/6,9/6"), hexamethylene adipamide/hexamethylene-isophthalamide ("nylon-6,6/6,I"), hexamethylene adipamide/hexamethyleneterephthalamide ("nylon-6,6/6,T"), nylon-6,T/6,I, nylon-6/MXD,T/MXD,I, nylon-6,6/6,10, and nylon-6,I/6,T.

Conventional nomenclature typically lists the major constituent of a copolymer before the slash ("/") in the name of a copolymer; however, in this application the constituent listed before the slash is not necessarily the major constituent unless specifically identified as such. For example, unless the application specifically notes to the contrary, "nylon-6/6,6" and "nylon-6,6/6" may be considered as referring to the same type of copolyamide.

Polyesters

The film 16 may comprise one or more polyesters. Useful polyesters include those made by: 1) condensation of polyfunctional carboxylic acids with polyfunctional alcohols, 2) polycondensation of hydroxycarboxylic acid, and 3) polymerization of cyclic esters (e.g., lactone).

Exemplary polyfunctional carboxylic acids (and their derivatives such as anhydrides or simple esters like methyl esters) include aromatic dicarboxylic acids and derivatives (e.g., terephthalic acid, isophthalic acid, dimethyl terephthalate, dimethyl isophthalate) and aliphatic dicarboxylic acids and derivatives (e.g., adipic acid, azelaic acid, sebacic acid, oxalic acid, succinic acid, glutaric acid, dodecanoic diacid, 1,4-cyclohexane dicarboxylic acid, dimethyl-1,4-cyclohexane dicarboxylate ester, dimethyl adipate). Useful dicarboxylic acids also include those discussed above in the polyamide section. As is known to those of skill in the art, polyesters may be produced using anhydrides and esters of polyfunctional carboxylic acids.

Exemplary polyfunctional alcohols include dihydric alcohols (and bisphenols) such as ethylene glycol, 1,2-propanediol, 1,3-propanediol, 1,3 butanediol, 1,4-butanediol, 1,4-cyclohexanedimethanol, 2,2-dimethyl-1,3-propanediol, 1,6-hexanediol, poly(tetrahydroxy-1,1'-biphenyl, 1,4-hydroquinone, and bisphenol A.

Exemplary hydroxycarboxylic acids and lactones include 4-hydroxybenzoic acid, 6-hydroxy-2-naphthoic acid, pivalolactone, and caprolactone.

Useful polyesters include homopolymers and copolymers. These may be derived from one or more of the constituents discussed above. Exemplary polyesters include poly(ethylene terephthalate) ("PET"), poly(butylene terephthalate) ("PBT"), and poly(ethylene naphthalate) ("PEN"). If the polyester includes a mer unit derived from terephthalic acid, then such mer content (mole %) of the diacid component of the polyester may be at least about any the following: 70, 75, 80, 85, 90, and 95%.

The polyester may be thermoplastic. The polyester (e.g., copolyester) of the film may be amorphous, or may be partially crystalline (semi-crystalline), such as with a crystallinity of at least about, or at most about, any of the following weight percentages: 10, 15, 20, 25, 30, 35, 40, and 50%.

Polystyrene

The film 16 may comprise one or more polystyrenes. Exemplary polysytrene includes stryrene homo- and co-polymers. Polystyrene may be substantially atactic, syndiotactic or isotactic. The term "polysytrene" includes copolymer that contains at least 50 mole % monomer units derived from styrene. Styrene may be copolymerized with alkyl acrylates, maleic anhydride, isoprene, or butadiene. Styrene copolymers with isoprene and butadiene may be further hydrogenated.

The film 16 may comprise at least about, and/or at most about, any of the following amounts of any one of the polymers described above: 10, 20, 30, 40, 50, 60, 70, 80, and 90 weight %, by weight of the film. A layer of the film may comprise at least about, and/or at most about, any of the following amounts of any one of the polymers described above: 20, 30, 40, 50, 60, 70, 80, 90, 95, and 100 weight %, by weight of the layer.

The film 16 may have a thickness and composition to impart a desired level of oxygen barrier attribute to the film and the lined tray. For example, the film may comprise one or more barrier components that markedly decrease the oxygen transmission rate through the film. One or more layers of the film may comprise the barrier components. Useful barrier components include EVOH, PVdC, polyalkylene carbonate, polyester, polyacrylonitrile ("PAN"), and polyamide, such as any of these polymers discussed above.

The film and/or the lined tray may have an oxygen transmission rate of at most about any of the following values: 1,000, 500, 100, 50, 45, 40, 35, 30, 25, 20, 15, 10, and 5 cubic centimeters (at standard temperature and pressure) per square meter per day per 1 atmosphere of oxygen pressure differential measured at 0% relative humidity and 23° C. All references to oxygen transmission rate in this application are measured at these conditions according to ASTM D-3985.

The film 16 may have low haze characteristics. Haze is a measurement of the transmitted light scattered more than 2.5° from the axis of the incident light. Haze is measured against the outside surface of the film, according to the method of ASTM D 1003, which is incorporated herein in its entirety by reference. All references to "haze" values in this application are by this standard. The haze of the film may be at most about any of the following: 20%, 15%, 10%, 9%, 8%, 7%, 6%, 5%, 4%, and 3%.

The film 16 may be transparent so that the printed image 18 may be clearly visible through the film. "Transparent" as used herein means that the material transmits incident light with negligible scattering and little absorption, enabling objects (e.g., print) to be seen clearly through the material under typical unaided viewing conditions (i.e., the expected use conditions of the material). The transparency (i.e., clarity) of the film may be at least about any of the following values: 65%, 70%, 75%, 80%, 85%, and 90%, as measured in accordance with ASTM D1746.

The film 16 may be manufactured by thermoplastic film-forming processes known in the art, for example, tubular or blown-film extrusion, coextrusion, extrusion coating, and flat or cast film extrusion. The film may be made by laminating two separately made layers together, for example, by adhesive lamination, or by lamination under heat and pressure.

Useful films 16 are described in U.S. Pat. Nos. 4,847,148 and 4,935,089, and in U.S. Ser. No. 08/326,176, filed Oct. 19, 1994 and entitled "Film/Substrate Composite Material" (published as EP 0 707 955 A1 on Apr. 24, 1996), each of which is incorporated herein in its entirety by reference.

Ink

One or more inks may be printed on the film to form, upon drying or curing, one or more ink layers 30 to create a printed image 18 and an outermost ink surface 56 of printed film 50. (FIG. 3B.) Several inks may be printed on the film by applying the inks as subsequent layers on top of each other, in which case the last printed ink may form the outermost ink surface 56. The printed image 18 may display any desired image such as logos, trademarks, graphics, written information, pictures, and/or designs.

The ink may comprise one or more inks selected from solvent-based ink, water-based ink, and radiation-curable ink. Solvent-based and water-based inks may comprise binder resin, colorant (e.g., one or more pigments or dyes), and solvent.

The binder resin may comprise one or more of ethylene/vinyl acetate copolymers, polyamide polymers, polystyrene polymers, and acrylic polymers. Specific types of the ethylene/vinyl acetate copolymers, polyamide polymers, and polystyrene polymers are discussed above with respect to the film, and any one or more of those listed polymers may be useful as the binder resin. Polyamide polymers useful as binder resin include those available, for example, from the Henkel Corporation under the Versamid trademark. An ink comprising EVA is commercially available, for example, under the trade name Flint T1W00161.

Useful acrylic polymers include polymers comprising acrylic acid or methacrylic acid groups (collectively, "(meth)acrylic acid groups") or alkyl esters of acrylic or methacrylic acid groups (collectively, "alkyl (meth)acrylate groups"). The alkyl (meth)acrylate groups may comprise, for example, from 4 to 12 carbon atoms.

Representative examples of alkyl (meth)acrylate groups include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and preferably from 4 to 5 carbon atoms. The acrylic polymer may comprise at least about 50 mole % of alkyl (meth)acrylate groups and/or (meth)acrylic acid groups.

The ink may comprise any of the following amounts of binder resin: at least about 5, 10, 15, 20, 25, 30, 35, 40, and 45 weight %; and/or at most about 50, 45, 40, 35, 30, 25, and 20 weight %, based on the weight of the ink. The ink may comprise any of the following amounts of any one or more of any of ethylene/vinyl acetate copolymers, polyamide polymers, polystyrene polymers, and acrylic polymers, such as any one of those identified in this Application: at least about 5, 10, 15, 20, 25, 30, 35, 40, and 45 weight %; and/or at most about 50, 45, 40, 35, 30, 25, and 20 weight %, based on the weight of the ink. These amounts of binder resin, and/or these amounts of particular types of binder resin, may be achieved by adding additional binder resin to a commercially available ink. Exemplary inks containing polyamide resin are available from Color Converting Ind. under the AXL trademark (such as, modified cellulose alcohol reducible inks).

The ink may comprise one or more solvents. Useful solvents include alcohols (e.g., ethanol, propanol, isopropanol, and isobutanol), alkyl acetates (e.g., ethyl, propyl, and butyl acetate), and low molecular weight hydrocarbon solvents (e.g., heptane and naphtha). Water-based inks comprise water as the solvent, as is known in the art, and may also comprise additional amounts of other solvents, such as alcohols, glycols, and glycol ethers.

The ink may comprise a radiation-curable ink. Radiation-curable inks include electron beam curable inks and ultraviolet light (UV) curable inks. As is known in the art, these inks are "cured"—that is, change from a fluid phase to a highly cross-linked or polymerized solid phase—by means of a chemical reaction induced by exposure to a radiation energy source.

Figure 2:
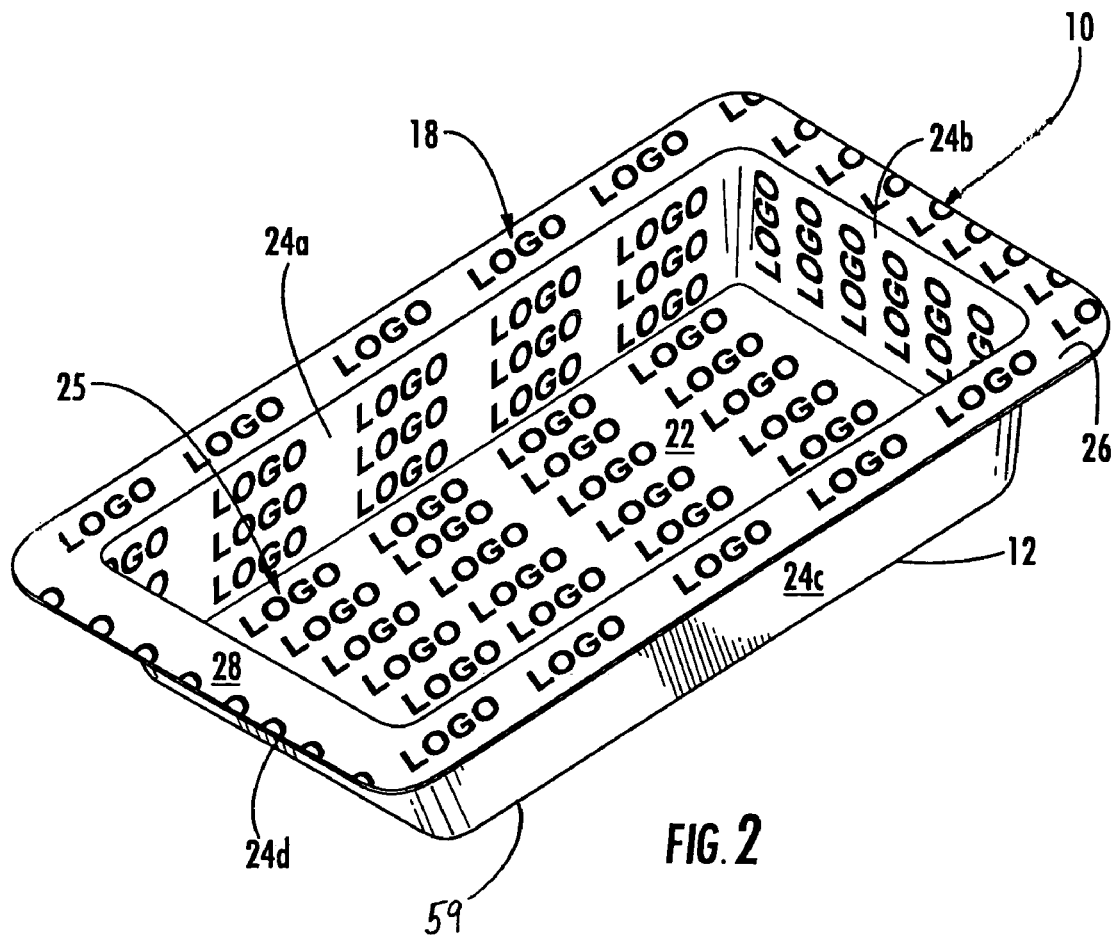
FIG. 2 is a perspective view of a lined tray 10 of the present invention.

The one or more inks may be printed on the film using any suitable method, for example, rotary screen, gravure, and flexographic methods. The printed film may include a plurality of repeating printed images for each tray (i.e., scatter print as illustrated in FIGS. 1-2) or the printed image may require registration to place the printed image in appropriate alignment when forming the lined tray (discussed below). The printed film may comprise one or more printed areas each comprising a printed image that continuously covers at least about any of the following areas of the film: 1, 2, 3, and 4 square inches. In this sense, continuously covers means that there is essentially no film surface within the selected printed area without a covering of printed ink or varnish.

Once the printed ink has dried (i.e., by solvent evaporation) or cured (i.e., by chemical reaction) sufficiently, then the printed liner 50 may be laminated to the tray substrate as discussed below or may have an overprint varnish applied over the printed ink as discussed below. The printed liner 50 may be wound into a roll configuration 40, and for example stored or shipped in the roll configuration for subsequent use at a later time or at a separate location from when or where the printed liner is made.

The printed film may show a reduced tendency for "pick off" of the ink. "Pick off" is the tendency of the dried ink (and/or overprint varnish) to partially transfer to the adjacent film when the film is placed in a roll configuration. If the printed film 50 is placed in a roll configuration, for example, a roll configuration having an effective diameter of rolled film of 2 feet, and is subsequently unwound, then at most about any of the following amounts of the dried ink may transfer (or otherwise depart) from the printed surface (i.e., the image side) of the film, based on the total weight of the dried printed ink: 10, 5, 3, 2, 1, 0.5, and 0.2 weight %.

Varnish

Figure 4A:
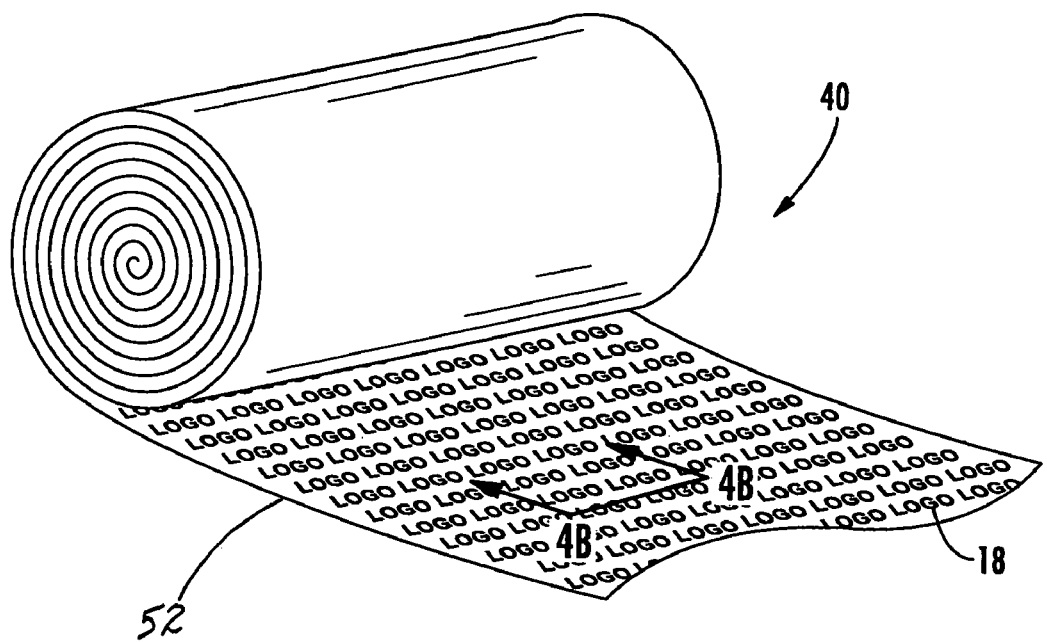
FIG. 4A is a perspective view of a varnished printed film 52 in roll configuration 40.
Figure 4B:
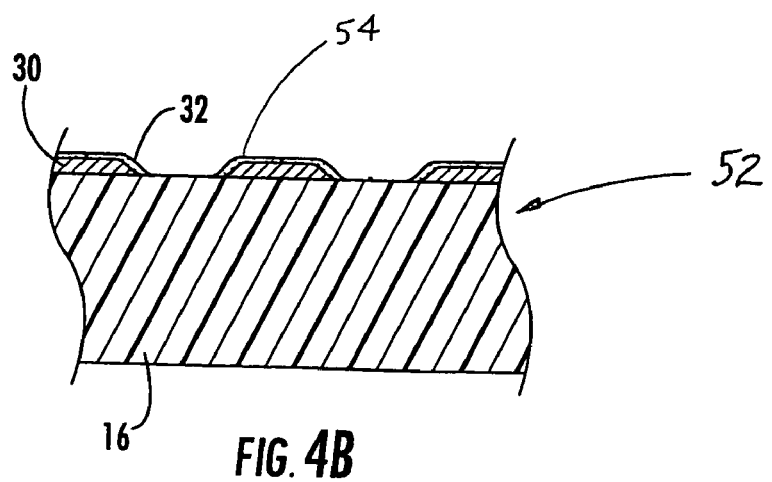
FIG. 4B is a representative view of a cross-section of the varnished printed film liner taken along line 4B of FIG. 4A.

An overprint varnish may be applied over at least a portion of the outermost ink surface of the printed film to form, upon drying, an outermost varnish surface 54 of a varnished printed film 52. (FIGS. 3A, 4B.) Useful overprint varnishes may comprise any of the same components as the ink formulations discussed above, but without the colorant components. Useful overprint varnishes include one or more varnishes selected from solvent-based varnishes and water-based varnishes.

The overprint varnish may comprise one or more of any of the binder resins, and one or more of any of the specific binder polymers, discussed above with respect to the inks. For example, the overprint varnish may comprise one or more of ethylene/vinyl acetate copolymers, polyamide polymers, polystyrene polymers, and acrylic polymers. Useful overprint varnishes include, for example, EVA clearcoat primer commercially available as Coates Alpine Primer (e.g., applied over a polyamide resin ink). A useful overprint varnish may be formed by dissolving polyamides, such as those available from the Henkel Corporation under the Versamid trademark, in an alcohol.

The overprint varnish may comprise any of the following amounts of binder resin: at least about 1, 5, 10, 15, 20, 25, 30, 35, 40, and 45 weight %; and/or at most about 50, 45, 40, 35, 30, 25, 20, 15, and 10 weight %, based on the weight of the overprint varnish. The overprint varnish may comprise any of the following amounts of any one or more of any of ethylene/vinyl acetate copolymers, polyamide polymers, polystyrene polymers, and acrylic polymers, such as any one of those identified in this Application: at least about 1, 5, 10, 15, 20, 25, 30, 35, 40, and 45 weight %; and/or at most about 50, 45, 40, 35, 30, 25, 20, 15, and 10 weight %, based on the weight of the overprint varnish. These amounts of binder resin, and/or these amounts of particular types of binder resin, may be achieved by adding additional binder resin to a commercially available overprint varnishes.

The overprint varnish may be applied to the outermost ink surface of the printed film using the same techniques as described above with respect to the application of ink to form the printed image. Exemplary techniques include screen, gravure, flexographic, roll, and metering rod coating processes. Although application of the overprint varnish may occur separate in time and/or location from application of the printed image, it may occur in-line with application of the ink that forms the printed image. For example, the overprint varnish may be applied to the outermost ink surface using the last stage of a multi-stage flexographic printing system.

The overprint varnish may be applied to cover essentially only the printed ink so that the non-printed portions of the film remain substantially uncoated and can be bonded directly to the tray substrate. Alternatively, the overprint varnish may be applied to cover a portion or all of the non-printed areas of the film.

Once the overprint varnish has dried sufficiently (i.e., by solvent evaporation), then the varnished printed film 52 may be laminated to the tray substrate 12 as discussed below. The varnished printed liner 52 may be wound into a roll configuration 40 (FIG. 4A), and for example stored or shipped in the roll configuration for subsequent use at a later time or at a separate location from when or where the varnished printed film is made.

The varnished printed film may show a reduced tendency for "pick off" of the varnish and ink. If the varnished printed film 52 is placed in a roll configuration, for example, a roll configuration having an effective diameter of rolled film of 2 feet, and is subsequently unwound, then at most about any of the following amounts of the dried varnish and ink may transfer (or otherwise depart) from the varnished, printed surface (i.e., the image side) of the film, based on the total weight of the dried varnish and printed ink: 10, 5, 3, 2, 1, 0.5, and 0.2 weight %.

Tray Substrate

The tray substrate 12 is a material that is adapted for subsequent formation into a tray, as discussed below. The tray substrate 12 may comprise one or more materials selected from polypropylene, polyethylene, polyester, polyurethane, and polystyrene. The tray substrate may comprise one or more of expanded (e.g., foamed) polypropylene, expanded polyethylene, expanded polyester, expanded polyurethane, and expanded polystyrene. The tray substrate may comprise any one of the forgoing materials in at least about, and/or at most about, any of the following amounts, based on the weight of the tray substrate: 50, 60, 70, 80, 90, 95, 98, and 100 weight %. The tray substrate may comprise a blend of virgin tray substrate materials mixed with recycled scrap tray substrate materials.

The tray substrate may be supplied, for example, in sheet form, for example, having a thickness of at least about, and/or at most about, any of the following: 2, 4, 6, 8, 10, 12, 14, 16, 18, 20, 25, 30, 35, 50, 100, 250, 500, and 1,000 mils.

Lined Tray

In one embodiment illustrated in FIG. 3B, the printed film 50 may be laminated to the tray substrate 12 to form a lined tray substrate 59 having the outermost ink surface 56 directly adhered to the tray substrate 12. In another embodiment illustrated in FIG. 3A, the varnished printed film 52 may be laminated to the tray substrate 12 to form a lined tray substrate 59 having the outermost varnish surface 54 directly adhered to the tray substrate 12. The resulting lined tray substrate has a printed image 18 disposed (i.e., trap printed) between the tray substrate and the film so that the printed image may be visible through the film. "Directly adhered" as used herein means that there is no intervening layer or material between the two directly adhered elements.

Useful techniques for laminating the film to the tray substrate are known in the art, and include, for example, applying heat, pressure, or both, to effect the lamination. For example, a varnished printed liner having a varnish comprising polyamide, may be laminated to a polystyrene foam tray substrate at a lamination temperature of 250° F., for example, using up to three lamination passes. The lamination step may use only (i.e., consist essentially of) the application of heat and/or pressure (e.g., by not including the application of an additional adhesive or glue layer) to effect the lamination.

The lined tray substrate 59 may be formed into a lined tray 10. (FIGS. 1-2, 5.) Lined tray 10 may comprise four side walls 24a-d and base 22—which define cavity 25 into which the product 14 may be disposed, and a peripheral flange 26 extending from side walls 24a-d to provide a sealing surface 28 for attaching a lid 17 to the lined tray to enclose the product 14 within the cavity 25. Although the illustrated embodiment shows a lined tray in one configuration, the lined tray 10 may have any desired configuration or shape, such as rectangular, round, or oval, with any desired depth for the cavity. As used herein, the term "tray" includes any type of support member that is adapted for supporting a product, and includes the configurations of, for example, a flat board, a bowl, a cup, and a plate.

The lined tray 10 may be substantially rigid, semi-rigid, or flexible. For example, representative samples of the lined tray may have a 1% secant flex modulus of at least about any of the following values: 120,000, 140, 000, 160, 000, 180, 000, 200,000, and 225,000 pounds/square inch.

The "interior" or "inner" surface or side of the lined tray means the surface adapted to support a product. The "exterior" or "outer" surface or side of the lined tray means the surface on the opposite side from the interior surface. The side of the lined tray to which the printed film (or varnished printed film) is laminated may form the interior surface of the lined tray, as illustrated in FIGS. 1-2, so that the printed image is visible on the interior of the lined tray. The side of the lined tray to which the printed film (or varnished printed film) is laminated may form the exterior surface of the lined tray, so that the printed image is visible on the exterior of the lined tray. The printed film (or varnish printed film) of the lined tray may be on both the interior and exterior sides of the lined tray, so that printed images are visible on both sides of the tray.

The supported product 14 may comprise a food product, for example, comprising meat selected from fresh red meat, chicken, or pork. The printed film 50 or varnished printed film 52 may substantially cover the surface of the tray substrate that is adapted to contact, or contacts, the supported product.

A method and system for making the lined tray is illustrated in FIG. 5. Tray substrate 12 is unwound from roll configuration 60 as a continuous web. Varnished printed film 52 is unwound from roll configuration 40 as a continuous web so that the printed image side of the film faces the tray substrate. The nip rolls 62a-b rotate in opposite directions to move the webs in the direction of the arrow. Both webs are fed through the nip formed by nip rolls 62a-b to apply pressure to laminate the webs together to form lined tray substrate 59. The nip rolls may be heated to provide heat to facilitate the lamination of the film 16 and tray 12 substrate together.

Forming station 68 comprises a thermoforming apparatus including a stamping device 70, which reciprocates against receiving mold 72 to press the lined tray substrate into the shape of a tray. Stamping device 70 and/or receiving mold 72 may be heated to facilitate the thermoforming process. Vacuum ports (not shown) in communication with a vacuum source may be provided in receiving mold 72 in order to further facilitate the thermoforming process by pulling the web 59 against the mold 72. At cutting station 74, cutting device 76 may sever lined tray 10 from the web. A plurality 78 of trays 10 may be stacked. The remnants of the lined tray substrate may be processed as scrap, for example, by grinding and pelletizing the scrap and recycling it, for example, by blending it with virgin polymer to make tray substrate 12.

Lamination Bond Strength

The term "lamination bond strength" as used herein means the amount of force required to separate or delaminate the laminated film (i.e., the printed film 50 or the varnished printed film 52) from the tray substrate 12, as measured in accordance with ASTM F88-00 where the Instron tensile tester crosshead speed is 10 inches per minute, using five, 1-inch wide, representative samples. The lamination bond strength between the film (i.e., either the printed film or the varnished printed film) and the tray substrate may be at least about any of the following: 0.4, 0.5, 0.6, 0.7, 0.8, 0.9, 1, 1.3, 1.5, 1.8, 2, 2.5, 3, 3.5, 4, 4.5, 5, 5.5, 6, 6.5, 7, 7.5, and 8 pounds per inch width.

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time)

may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

What is claimed is:

1. A method of making a lined tray comprising:
   printing on a film an ink comprising from about 15 to about 50 weight percent, based on the weight of the ink, of binder resin selected from one or more of ethylene/vinyl acetate copolymers, polyamide polymers, polystyrene polymers, and acrylic polymers;
   drying the ink to form an outermost ink surface of a printed film; and
   laminating the printed film to a tray substrate to form a lined tray substrate, wherein the outermost ink surface is directly adhered to the tray substrate; and
   forming the lined tray substrate into a tray.

2. The method of claim 1 wherein the printed film comprises one or more printed areas each comprising a printed image that continuously covers at least about 1 square inch of the film.

3. The method of claim 1 wherein the printed film comprises one or more printed areas each comprising a printed image that continuously covers at least about 2 square inches of the film.

4. The method of claim 1 wherein the lamination bond strength between the printed film and the tray substrate is at least about 0.5 pounds/inch.

5. The method of claim 1 wherein the lamination bond strength between the printed film and the tray substrate is at least about 1 pounds/inch.

6. The method of claim 1 further comprising the steps of:
   winding the printed film into a roll configuration; and
   unwinding the printed film from the roll configuration, wherein the winding and unwinding steps occur before the lamination step.

7. The method of claim 1 wherein the tray substrate comprises one or more materials selected from polypropylene and polyethylene.

8. The method of claim 1 wherein the tray substrate comprises one or more materials selected from expanded polypropylene and expanded polyethylene.

9. The method of claim 1 wherein the tray substrate comprises one or more materials selected from polyester and polyurethane.

10. The method of claim 1 wherein the tray substrate comprises one or more materials selected from expanded polyester and expanded polyurethane.

11. The method of claim 1 wherein the tray substrate comprises polystyrene.

12. The method of claim 1 wherein the tray substrate comprises expanded polystyrene.

13. The method of claim 1 wherein the ink comprises a solvent-based ink.

14. The method of claim 1 wherein the ink comprises a water-based ink.

15. The method of claim 1 wherein the ink comprises at least about 20 weight percent, based on the weight of the ink, of the binder resin.

16. The method of claim 1 wherein the ink comprises at least about 30 weight percent, based on the weight of the ink, of the binder resin.

17. The method of claim 1 wherein the ink comprises from about 20 weight percent to about 35 weight percent, based on the weight of the ink, of the binder resin.

18. The method of claim 1 wherein the ink comprises at least about 40 weight percent, based on the weight of the ink, of the binder resin.

19. The method of claim 1 wherein the binder resin is selected from one or more ethylene/vinyl acetate copolymers.

20. The method of claim 1 wherein the binder resin is selected from one or more polyamide polymers.

21. The method of claim 1 wherein the binder resin is selected from one or more polystyrene polymers.

22. The method of claim 1 wherein the binder resin is selected from one or more acrylic polymers.

23. The method of claim 1 wherein the film comprises one or more polymers selected from ethylene/vinyl alcohol copolymers and vinylidene chloride polymers.

* * * * *